United States Patent

[11] 3,610,646

| [72] | Inventors | Emile Bobard<br>17, Rue de Reon, Beaune, Cote d'Or;<br>Just Delaunay, L'Etang-Vergy, Cote D'Or,<br>both of France |
|---|---|---|
| [21] | Appl. No. | 819,199 |
| [22] | Filed | Apr. 25, 1969 |
| [45] | Patented | Oct. 5, 1971 |
| [32] | Priority | Apr. 30, 1968 |
| [33] | | France |
| [31] | | 150141 |

[54] STABILIZERS FOR VEHICLES WITH NARROW BASE SUPPORT
10 Claims, 24 Drawing Figs.

[52] U.S. Cl. .................................................. 280/6 H, 280/124 F
[51] Int. Cl. .................................................. B60q 17/00

[50] Field of Search ............................................ 280/6, 6.1, 6 H, 6.11; 11/124 F

[56] References Cited
UNITED STATES PATENTS

| 2,165,617 | 7/1939 | Paes | 280/6 H |
| 3,175,837 | 3/1965 | Bobard | 280/6.1 |

FOREIGN PATENTS

| 483,365 | 7/1953 | Italy | 280/6 H |

Primary Examiner—Philip Goodman
Attorney—Wilkinson, Mawhinney & Theibault

ABSTRACT: The stabilization of a vehicle with narrow base support is ensured by two aligned wheels. The device comprises two load-bearing wheels mounted on either side of the vehicle support base on hydraulic supports which are hydraulically adjustable in length and associated with a device equipped with a supporting jack for controlling the length adjustments of the hydraulic supports.

STABILIZERS FOR VEHICLES WITH NARROW BASE SUPPORT

BRIEF DESCRIPTION OF THE INVENTION

The invention concerns a stabilizing device applicable to a vehicle with narrow base support such as (for example) a tractor with two aligned wheels or a vehicle comprising a single wheel or a set of wheels that constitute a longitudinal or crosswise support base.

It likewise relates to means intended to equip a stabilizer of the type that has been mentioned, to direct the resultant of forces applied to the vehicle (for example, the resultant of its load and the centrifugal force generated by a turn) toward the interior of the polygon of support established by such a device.

Stabilizing devices for vehicles with narrow base support are known, specifically for tractors with two aligned wheels, one behind the other, which constitute an unstable balancing base.

Such devices ensure transverse stability of the vehicle on flat or sloping terrain against its load, by means of:

1. two wheels, mounted on either side of the vehicle on mechanisms associated with the vehicle frame, to constitute stabilizing bearings
2. at least one supporting jack, partly associating the said mechanisms to the vehicle frame
3. a detector system sensitive to the forces of displacement at least of the other mechanism, with reference to a stabilizing stop device provided on the said mechanism
4. a pressurized fluid circuit with means mechanically responsive to the said detector to supply the supporting jack and thus to right the tractor each time that the frame thereof tends to swing, moving away from the stop device provided on the other mechanism.

This jack, moreover, can ensure a stabilizing stop for each mechanism with which it is associated when the direction of travel of the vehicle is opposed to the bearing of the frame on the stop of the other mechanism, account being taken of the slope of the terrain.

Moreover, stabilizing devices of the type described above are frequently designed to control mechanisms which symmetrically ensure movements of the stabilizer wheels that are of equal height and in opposed directions, to hold the vehicle in a substantially vertical plane.

But the devices that have been mentioned require complex means permanently to hold the fluid circuit for the supporting jack under pressure and besides the means for transmission of movement from the detector system to the means for supplying the jack are complicated and delicate in operation.

The invention is addressed to the remedying of these defects.

It relates to a stabilizing device that is applicable to a vehicle with narrow base means of support, such as a set of wheels that extends either longitudinally or crosswise.

Such a stabilizer comprises elements that are analogous to those of known stabilizers, and it presents:

1. at least two bearing elements mounted on either side of the support base of the vehicle, on mechanisms associated with the frame of the said vehicle
2. a supporting jack
3. a detector system that is responsive to the effects of one of the mechanisms associated with the vehicle frame
4. a fluid circuit connected to the said supporting jack and supplied with means slaved to the said detector, for ensuring the operation of the jack.

According to the invention, the detector system comprises a hydraulic element that is responsive to the effect of load variation on a mechanism associated with the frame, and the supporting jack is combined with a system, namely a system of jacks provided to control at least one of the said mechanisms.

The hydraulic element of the detector system is advantageously sensitive to a change of pressure that follows a variation of load on a mechanism.

Preferably such an element presents the form of an air chamber which can be incorporated advantageously into one of the elements of a set of bearing members to detect a variation to load applied on the said member. In this way simple conduits replace the conventional mechanical or electromechanical means that are used for the transmission of load variations in known stabilizers.

According to another characteristic of the invention, the means slaved to the detector system to ensure operation of the supporting jack comprises constricting elements disposed on the fluid circuit, downstream from the connections of the said jack, in order gradually to regulate the fluid pressure in the said jack as a function of the load variations applied to the detector system.

Such a constricting element can advantageously have the form of a hydraulically controlled slide valve, controlled by a detector air chamber. It is understood that this valve allows elimination of the complex devices intended permanently to pressurize a fluid store for supplying the supporting jack.

In addition, such a valve allows gradual adjustments of the fluid pressure in the supporting jack that are in proportion to the load on the bearing member, ensuring the vehicles's stability to a remarkable degree.

Besides, in the case in which the terrain is irregular, by virtue of their mechanisms, the bearing elements of the device can be shifted with reference to the vehicle frame, and the valve system then ensures control of a fluid flow in the supporting jack, the direction of the said flow being adapted to he direction of displacement of the said bearing members.

Such devices can of course equip a variety of vehicles, with wheels aligned either coaxially or one behind the other, to ensure stability on sloping terrain in the course of respective movements either on a line of maximum slope or on a level curve, and in any case the direction of the vehicle load is guided toward the inside of the support polygon which is determined by the bearing members and the vehicle wheels.

However, certain ways of using various modifications of such a vehicle can lead to the directing of the resultant of forces applied to the vehicle toward the narrow support base. This is especially the case when vehicles with aligned wheels effect a turn at a speed that is high enough so that the centrifugal force tends transversally to counteract the sticking of the wheels to the ground.

The invention provides, for this purpose, simply hydraulic means which can readily be combined with the hydraulic means of the device described above for directing the resultant of forces applied to the vehicle toward the narrow support base per se.

According to the invention, the device comprises means for shifting a load, which comprises part of the vehicle, the said means being controlled by an element that is slaved to the load detector for the mechanisms associated with the frame.

Such a load can be constituted by a mass associated with the displacing jack. This displacement of the mass shifts the resultant of forces applied to the vehicle toward the support base thereof. But it is likewise possible to provide a jack that ensures relative displacements of bearing of the device with reference to the vehicle frame, to effect a tilting of the frame, which tilt is appropriate for the direction of the resultant of forces toward the support base per se of the vehicle.

Such a stabilizing device with tilting jack can advantageously be combined with known hydraulic mechanisms to provide a stabilizing device that is remarkably simple and precise in its operation.

The invention relates finally to a modification which comprises simply a system of jacks slaved to a supporting jack, and distribution means which allow transfers of fluid to ensure stabilization by changing the tile of the vehicle, analogously to the results which have been described above.

Such a stabilizing device furthermore can be advantageously simplified to ensure a preferential bearing to a vehicle with narrow base support, constituted by a mechanical stop device.

Other characteristics and advantages of the invention will become evident from the following description with reference to the attached drawings, the said description and drawings being presented only as nonlimitative example.

DETAILED DESCRIPTION OF THE INVENTION

Figure 1:
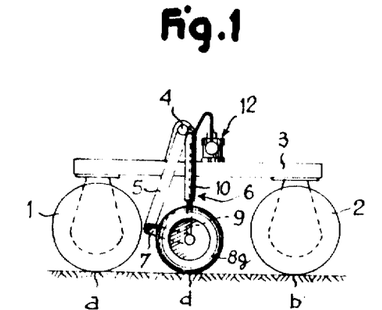
FIGS. 1, 2 and 3 represent respectively side, transverse and plan views of a stabilizer of the invention.
Figure 2:
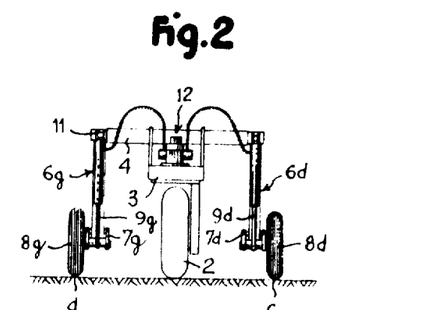
Figure 3:
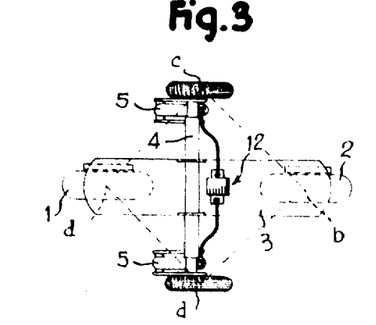

In FIGS. 1 to 3, there is visible the silhouette of a tractor with two drive steering wheels 1, 2 mounted in alignment below a raised frame 3. These wheels constitute a support base $a, b$ which is too narrow to ensure the balance of this tractor at ordinary speeds of travel. Frame 3 consequently has a fixed crossbar 4 with plunger arms $5d$ and $5g$, at each end, which allow the mounting on either side of the tractor mechanisms with rods $6d$, $6g$ and cranks $7d$, $7g$ which comprise mechanisms for association of two wheels $8d$, $8g$ to frame 3, 5 the said wheels being applied to the ground as will be explained below, thus to form with wheels 1, 2 a quadrilateral of support, $a, c, b, d$.

Each rod 6 comprises a piston rod 9 articulated on crank 7 and slidable in a cylinder 10 whose base is articulated in a bearing member 11 on crossbar 4, so that rod 6 constitutes a prop of adjustable length for its wheel 8.

Props 6 can be controlled by a hydraulic device 12 which comprises substantially (FIG. 4) a system of three jacks 16, 17 18 whose cylinders are rigidly fixed on a base 13. Piston 14 of jack 16 is disposed so that it exerts a thrust, solely in the direction of its expansion, on the central rod of a rocking lever $p$ whose arms are applied at their ends to pistons $15d$, $15g$ of two other jacks 17, 18, which are respectively connected to cylinders $10d$, $10g$ of the lateral mechanisms of wheels 8.

Figure 4:
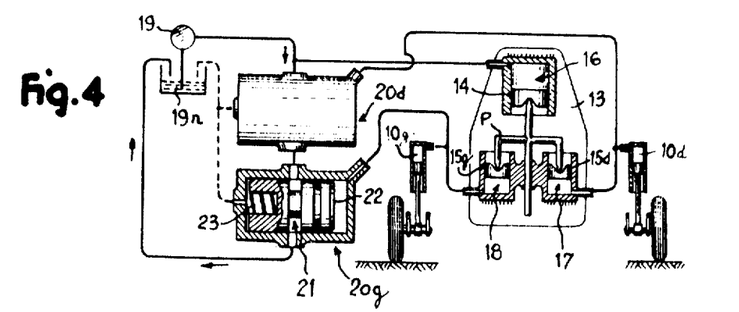
FIG. 4 shows schematically a stabilizing device of the invention in axial section.

Thus, it can be seen that by means of such a rocking lever, jack 16 is able to counterbalance at least one of the expansions of two other jacks 17 and 18.

In addition, jack 16 presents a conduit which takes off from the drive circuit of a pump 19, upstream of two identical valves $20d, 20g$, disposed in series in the said circuit.

Finally, each valve presents a slide with annular flow constriction element 21 and a piston 22 which is urged toward a position of closure by a spring 23. The said valve can be opened by the action of the fluid from jack 17 (or 18) and cylinder 10, to which the said valve is connected.

This device (FIG. 4) operates in the manner described below, to ensure transverse stability of the tractor of FIGS. 1 to 3, on which it is mounted. The midplane of the tractor remains normal to the line of bearing of wheels 8.

The pump 19 permanently sucks the fluid from tank $19n$ and passes this fluid toward valves $20d, 20g$. This fluid passes through the constriction elements 21 of these valves without causing an action capable of modifying the position of their slides, then returns to the tank $19n$, establishing a circuit whereof tank $19n$ constitutes a part that is subject to atmospheric pressure.

The slide of each valve 20 is thus subjected only to two thrusts of opposed direction: the thrust of the spring 23 and the thrust of the fluid on the piston 22. These thrusts (to which reference will be made again hereinafter) have the effect of moving the constriction element 21 inside its cylinder in order to regulate the flow section of the circuit of pump 19.

This regulation of the flow section of this circuit ensures, by throttling of the stream, regulation of the pressure of the fluid of the part of the circuit situated upstream of valves $20d, 20g$ and, in particular, the pressure of the fluid of jack 16.

The force applied by this pressure of the fluid on the piston 14 of jack 16 counterbalances, thanks to the rocking lever P, the forces applied on pistons $15d, 15g$ by the pressures of the fluids of the jacks 17, 18.

The chambers of these tow jacks 17, 18 are connected to the respective cylinders $10d, 10g$ to apply on wheels 8, by means of props 6, forces ensuring the stability of the vehicle in the crosswise direction $c, d$.

Figures 11A, 11B, 11C, 12:
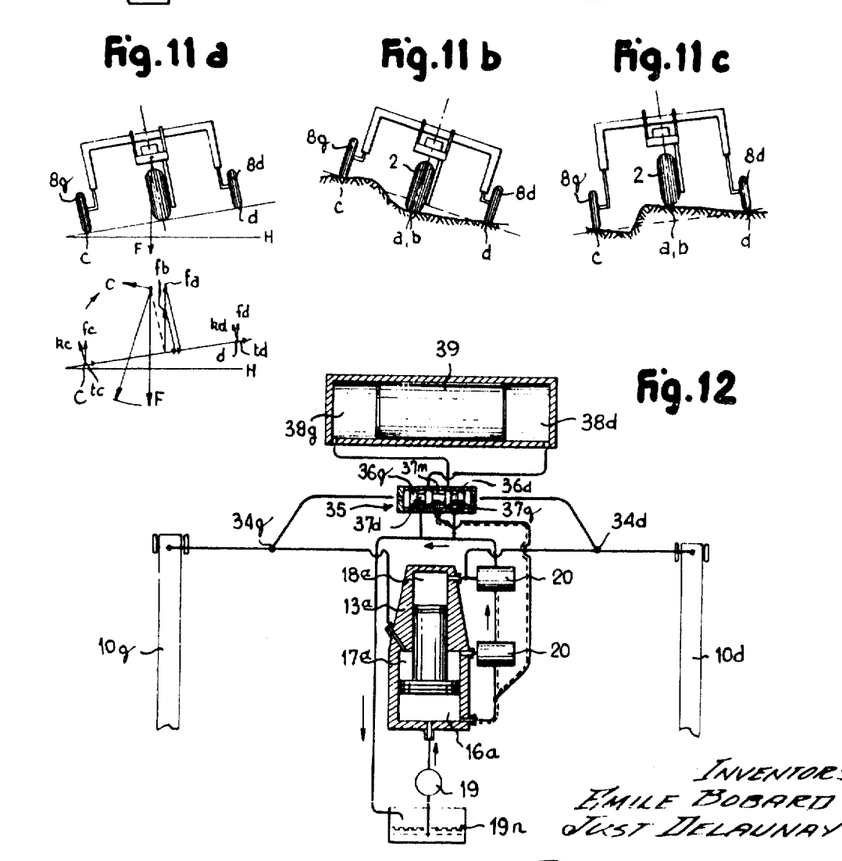
FIGS. 11a, 11b, and 11c are schemas relating to balance of a vehicle equipped with a device of the invention, on various terrains.

The load of F of the tractor is in fact balanced (on a horizontal or inclined terrain) by the reactions $fa, fb$ of wheels 1 and 2 and by one at least of the two reactions $fc, fd$ of wheels $8d, 8g$ of the device (FIG. 11a).

To these reactions $fc, fd$ correspond thrusts $kc, kd$ of the respective props $6d, 6g$ on the wheels 8 and these thrusts $kc, kd$ determine, in the closed volume systems $17-10d$ and $18-10g$, pressures which are transmitted to the chambers with pistons 22 of the respective valves $20d, 20g$.

In his way, the thrust applied by the fluid on a piston 22 (which thrust is a function of the section of this piston and of said pressure) counterbalances the thrust of the springs 23 (which is a function of the crushing of said spring) in order to ensure to its constriction element 21 a position of balance which is consequently a function of the corresponding load $kc$ (or $kc$).

In this case of a crosswise inclined position of the tractor of flat terrain, thrusts $kc, kd$ and consequently the pressures of the hydraulic systems (such as $17-10d$) are different from each other; the valve 20 connected to the hydraulic system of the wheel 8 bearing the smaller load (for example wheel $8d$ in the case of FIG. 11a) is in a more closed position than the other valve, so that the element 21 of this valve takes up a position which ensures to the jack 16 a pressure sufficient for the force of the piston 14 to be equal to the arithmetical sum of the forces of the pistons $15d, 15g$ which correspond to thrusts $kc, kd$ of wheels $8d$ and $8g$.

In the case of flat horizontal terrain, these thrusts $kc, kd$ may be practically equal to each other so that it may be supposed that the first valve of the circuit ($20d$ in the example) regulates the pressure of jack 16.

In addition, since the closed volume systems $17-10d$, $18-10g$ are identical to each other, the action of jack 16, in the direction of its expansion, obviously causes equal elongation of props 6d, 6g so that, in all cases, the median plane of the tractor has a normal position along the bearing line of wheels 8d, 8g.

Obviously, the power of the pump 19 is appropriate for the maximum pressure to be developed in jack 16 and the crush resistance of the closing spring is appropriate for a gradual valve-opening action, so that the pressure thus regulated is applied in a practically statis manner to jack 16.

As a result, taking into account the loads which may be applied to wheels 8 and the corresponding forces on the pistons 14, 15d, 15g of jacks 16, 17 and 18, there are chosen, preferably for the particularities of a valve 20, values which ensure, in the case of a tractor on horizontal ground, thrusts on wheels 8 sufficiently great to maintain the tractor in a perpendicular position which corresponds substantially to its position of unstable balance but low enough not to modify appreciably the loads applied to wheels 1 and 2 for good sticking of said wheels on the ground.

It will be noted that as a variation, the closing of a valve 20, for regulation of the minimum fluid pressure in the jack 16, may be ensured by another fluid subjected to pressure. Thus (FIG. 4) the conduit 19r which ensures return to tank 19n of the fluid which may escape from valves 20 may be equipped:
  with a takeoff conduit 19d comprising two branches each of which is connected to a chamber 23c provided in the part of each valve that is opposed to the piston 22,
  with a spring valve device 19c or a device with an orifice calibrated to ensure a substantially predetermined pressure to the fluid contained in chambers 23c.

Figures 9, 14:
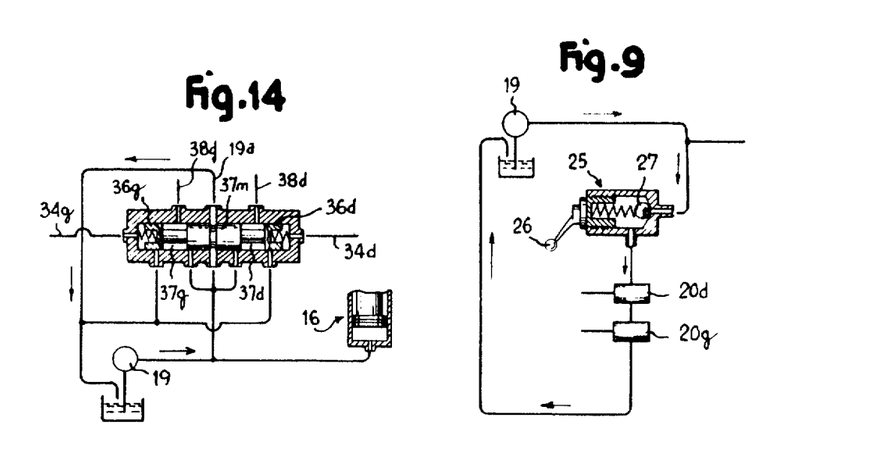
FIG. 9 shows schematically a hydraulic circuit identical to that of the device of FIG. 4 and equipped with an element for regulation of pressure in the said circuit.
FIG. 14 shows, in longitudinal section, a modification of a valved hydraulic distributor which can equip the devices of FIGS. 12 and 13 respectively.

This device 19c can moreover comprise a spring valve with a handle, for example a device similar to that of flG. 9, to adjust the compression of the spring valve. These adjustments ensure the regulation of the pressure in chambers 23c of valves 20.

It is further to be noted that the threshold of control of pressure in the supporting jack 16 is predetermined by the section of piston 22 of a valve 20 and by the crush resistance of spring 23, or by the pressure admitted to chamber 23c of the said valve 20.

Consequently, account being taken of the loads that can be allowed on wheels 8 and of the stresses on the pistons of jacks 16, 17, 18, there are selected for a valve 20 values that ensure, in the case of a tractor on horizontal terrain, thrusts on wheel 8 that are sufficient to hold the tractor in a vertical position which corresponds substantially to its position of unstable equilibrium, but low enough not appreciably to modify the loads applied to wheels 1 and 2, for good sticking of the said wheels to the ground.

Besides such a device can function on terrains that present irregularities large enough to move one of wheels 8 beyond a plane determined by contact points a, b of wheels 1 and 2 and the point c or d of the other wheel 8. An unevenness of the terrain that raises wheel 8g, for example, out of the plane abd (FIG. 11b) tends to make the tractor tilt toward the other wheel 8d and lift one of wheels 1 or 2 off the ground. The extra loading of rods 6 which is the consequence causes valves 20 to open to allow unloading of jack 16 and equal shortening of rods 6 by transfer of fluid from cylinders 10 in jacks 17 and 18. Conversely (FIG. 11c) when wheel 8g tends to be lowered below plane abd the reduction of the load on rod 6g closes valve 20g and supplies jack 16 to elongate rods 6 equally, by transfer of fluid until the transverse stability of the tractor is obtained.

Obviously, the output of pump 19 must be sufficiently great, and the conduits must present appropriate sections, to avoid a breaking of transient contact between one of pistons 15d, 15g and rocker lever "P" as a consequence of variation of load on rods 6.

Moreover, such breaks of contact in the direction of bearing on wheels 8 can be avoided (FIG. 5) by establishing the system of jacks 16 to 18 as a cylinder 13a with two coaxial recesses for two pistons 14a, 15a which are rigidly connected, so that in their respective recesses there are a jack 16a, an annular jack 17a and a jack 18a with jacks 16a opposed to the action of jacks 17a and 18a.

Figure 5:
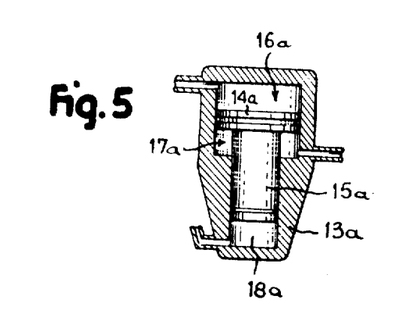
FIG. 5 shows in section a modification of the jack system of the device of FIG. 4.

It is pointed out that, to ensure substantially equal operating pressures in cylinders 10, the sections thereof are inversely proportional to the distance between the rods of wheels 8 and frame of the tractor. Jacks 17a and 18a present generally equal sections, and since the section of piston 14a is double that of piston 15a, the pressure in jack 16a is equal to the arithmetical mean of pressures prevailing in cylinders 10 associated with jacks 17a and 18a.

Finally, base 13 of jacks 17 and 18 (or cylinder 13a), valves 20, pump 19 and its tank, can constitute a compact unit which may conveniently be mounted on any part of the tractor without setting up particular reactions on the tractor.

Moreover, jacks 17 and 18 and cylinders 10 associated with them for the transmission of the supporting effect of jack 16 to wheels 8 constitute hydraulic means that are practically rigid in the direction of bearing on the wheels and (FIG. 6) it is to be observed that identical results are obtained by mounting a cylinder of jack 16 on frame 3 and attaching the piston of the said jack on a rigid structure whose two parts 17b, 18b are respectively connected rigidly to the two rods 9d, 9g which are engaged in guides provided on frame 3.

Figure 6:
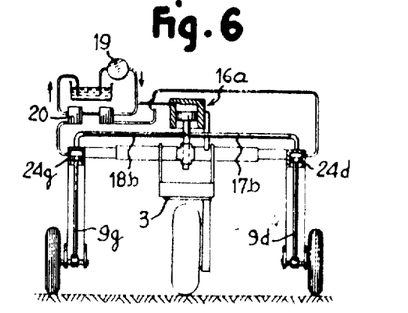
FIG. 6 shows schematically a modification of the device of FIG. 4.

However, for this form of embodiment one of the elements of jack 16 (in this instance the cylinder) must bear on frame 3 of the vehicle, to ensure its supporting effect, and each rod 9 must have an element allowing detection of the slightest variation of the load that acts on it, to control the slide of one of valves 20 by means that are appropriate to the nature of the said valve. Such a detector can be simply a hydraulic chamber 24 which, in the embodiment of FIG. 4, is incorporated in cylinder 10 of the mechanism of wheel 8.

In addition, each chamber 24 can be combined with its valve 20 (FIG. 7) to constitute a means for controlling the pressure in the supporting jack; such a means is then incorporated in the corresponding rod 6.

Figures 7, 13, 16:
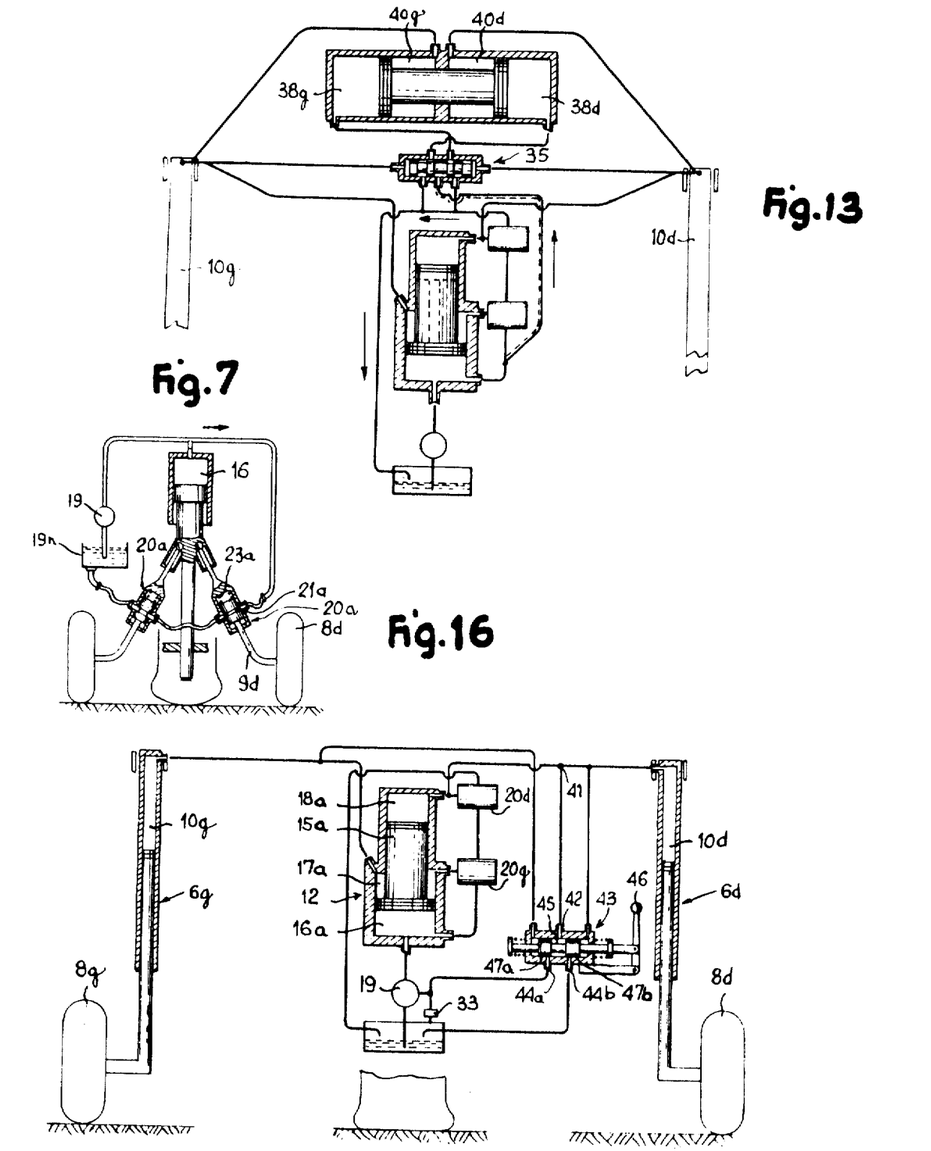
FIG. 7 shows schematically a modification of the device of FIG. 6.
FIGS. 12 and 13 show schematically two modifications of the device of the invention which allow direction of the resultant of forces applied to a vehicle toward the support base per se.
FIG. 16 shows schematically, in section, the hydraulic circuits of another modification of the device of the invention.

Such a combination is presented in the form of a valve 20a with a constriction slide 21a which is urged toward a position of closure by a spring 23a and subject to the opening thrust of rod 9 of a wheel 8 which in this modification is directly mounted on the opening piston of the said slide. Such a means is sensitive to the effect of relative movement of a wheel 8, to control the pressure in the fluid circuit.

Figure 4A:
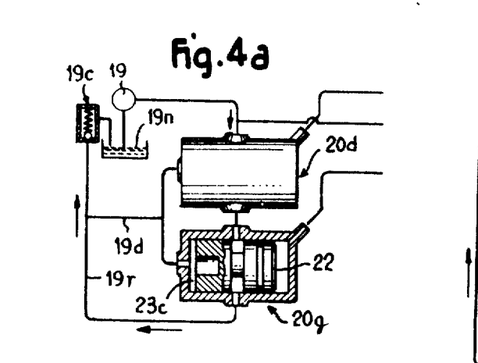
FIG. 4a shows schematically a modification of the hydraulic circuit of FIG. 9.

It is to be noted that closing spring 23a can be replaced by the hydraulic device of FIG. 4a; the downstream, low-pressure part of the circuit of pump 19 is provided with a valve similar to valve 19c (FIG. 4a).

In addition, with reference to the threshold of control of the pressure in jack 16, means can be provided for the control of the resistance of each spring 23, to regulate as desired the minimum load applied to at least one rod 6, until a sufficient value is reached to relieve wheels 1, 2 of the tractor, to facilitate e.g. steering and thus to avoid use of heavy auxiliary steering mechanisms.

Figure 8:
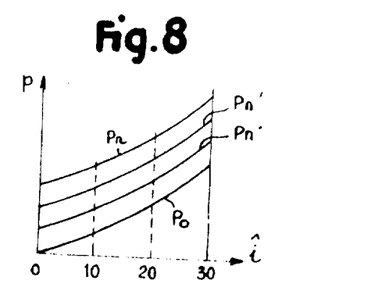
FIG. 8 shows a diagram of the pressures that can be generated as a function of the slope of the terrain, in the hydraulic parts of the device of the invention.

Such controls of the thrust for opening a valve can ensure a broad range po, pn of regulation of pressure in supporting jack 16. These values are shown as a function of various slopes of the terrain in the diagram of FIG. 8.

Finally, the regulation of minimal pressure of supporting jack 16 which corresponds to a placement of the tractor on substantially flat terrain can be effected also by throttling, using a device 25 (FIG. 9) which can be controlled as desired, e.g. manually by a handle 26, to adjust the resistance of a valve spring 27, to constrict the flow section of the circuit of pump 19.

Figure 9A:
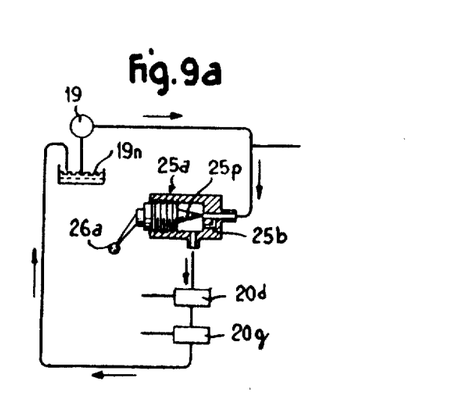
FIG. 9a shows schematically a variation of the hydraulic circuit of FIG. 9.

When the force flow of pump 19 is substantially uniform, it is also possible to use a device 25a (FIG. 9a) with a point 25p that is controllable by a handle 26a opposite the seat, to ensure regulation of maximum pressure in jack 16 by constriction of the flow section of this seat, which comprises a bypass conduit 25b, ensuring partial flow in valves 20.

The said bypass conduit 25b must allow flow from pump 19 for a maximum pressure that is determined by adjustment of a valve to protect the high-presssure part of the pump circuit. (This valve, which is not illustrated, can be like valve 33 of FIG. 10, for example).

In addition, to avoid a slow discharge from supporting jack 16 when the tractor is stopped, such a device can advantageously be equipped with a means for cutting off the said jack 16. This closing means acts automatically as soon as pump 19 stops, and it can moreover promote operations for purging the circuits of the stabilizing device when the said circuits are filled.

This device (FIG. 10) comprises a cylinder 25a and a throttling chamber 28 which is slidable in the said cylinder, acted upon by a spring 29 to obturate, hermetically, the conduit of jack 16 by means of a valve 30 which is disposed at the end of the throttling chamber that is opposite the spring and, partially, a feed port of valves 20 by means of slight tapering of chamber 28, the conduit of jack 16 being here mounted as a derivation of cylinder 25a, and the thrust of the spring being manually adjustable by a screw device 26a, to effect minimal adjustments of pressure or the above mentioned purge operations.

Figure 10:
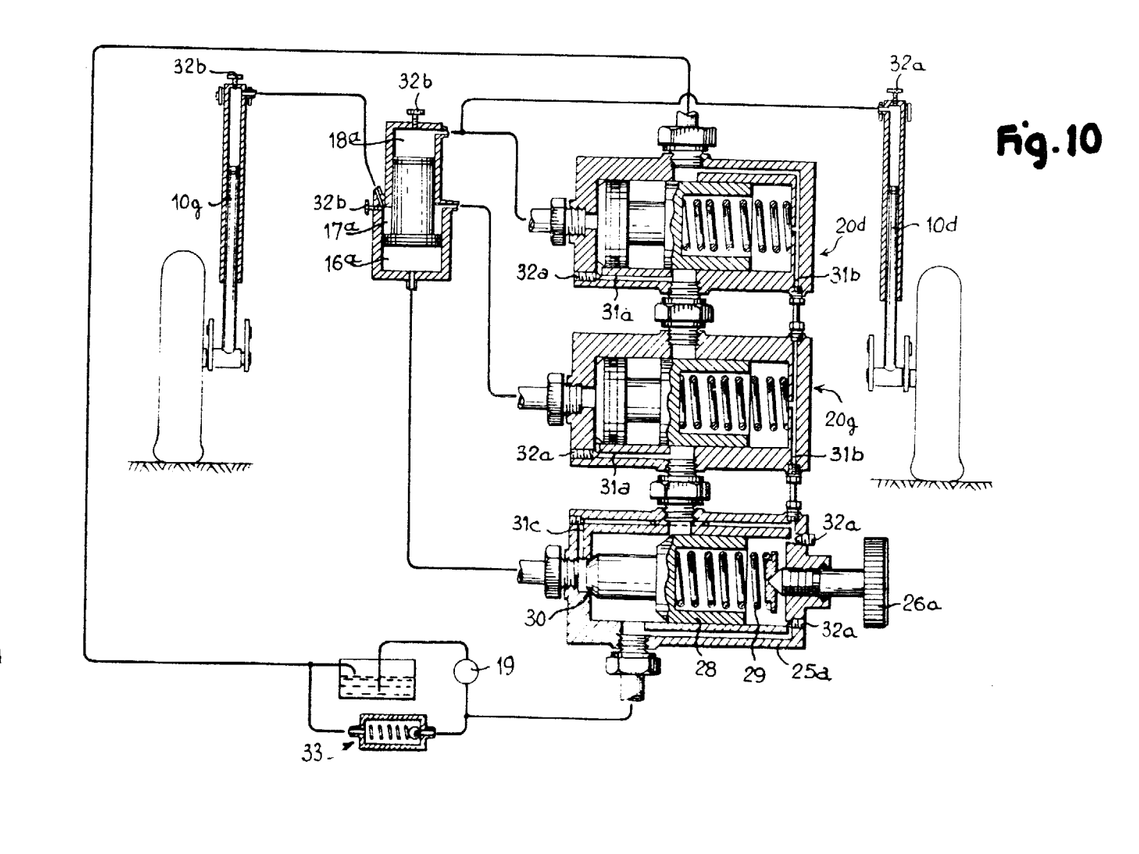
FIG. 10 shows schematically in axial section the essential elements of a modification of the hydraulic circuit of FIG. 9.

It is to be noted that the range of adjustment of this device is limited by the complete opening of chamber 28, taking into account the tension of spring 29.

In addition, conduits with small section are disposed in the walls of the said throttling chamber cylinder and those of valves 20, to constitute circuits 31a, 31b, 31c for filling, draining and purging: the filling operations can be effected by judicious use of plugs 32a of the said circuits 31.

Of course, for purging, plugs 32b are also supplied for the "-high points" of the various parts of the hydraulic circuit, and a valve 33 suitably adjusted allows discharging of pump 19, to avoid the effect of accidents, particularly during a purge operation.

It is pointed out that the device described above could present valves of another type, e.g. valves with a throttling chamber arranged to turn upon encountering resistance of a closing spring, through the action of appropriate elements, and controlled by means sensitive to variations of load on a rod. For example, a valve or a piston with throttling chamber can be provided, to pivot under the effect of the fluid of a chamber 10, but it is then necessary to correct the parasitic effect of flow on the throttling chamber, for a given throttling position thereof.

Moreover, it is understood that such a device can ensure the stability of a tractor with two aligned wheels turning on sloped terrain (FIG. 11a) and even at speeds high enough to develop an appreciable crosswise centrifugal force. The resultant of load "F" of the tractor and of such forces resulting from this movement must be directed toward the interior of polygon a, c, b, d and can only be balanced by the resultant of the reactions of wheels 8 and wheels 1 and 2 on the ground and of a couple "C" applied to the frame elements of the tractor. Reactions fc, fd of wheels 8 comprise adherence components tc, td of the elastic tires on the wheels, to prevent the skidding of the said tires.

But to promote such possibilities of development while ensuring the safety by judicious load distribution on wheels 8, 1 and 2, the invention also provides simple, readily adaptable means for this stabilizing device, to direct the resultant of forces permanently toward the narrow support base a, b of the tractor.

In FIG. 12 a cylinder 13a is seen which presents to recesses for three jacks 16a, 17a and 18a, the circuits of a pump 19 furnished with valves 20 and cylinders 10 of rods 6.

The communicating conduits of cylinders 10 to their respective jacks present branches 34d, 34g respectively, mounted on the opposite ends of a distributor with slide 35.

The ends parts of such a slide are made in the form of two opposed pistons 36d and 36g respectively, urged preferably by recall springs and the antagonistic thrust of fluids from chambers 10, to shift three annular constrictions 37d, 37m and 37g opposite ports which allow simultaneous communication on the one hand, between the high-pressure part of the circuit of pump 19 and of the cylinder of a jack 38g, for example, and, on the other hand, between the low-pressure parts of the circuit of the said pump and the cylinder of the other jack 38d which is identical with jack 38g on the opposite side.

There tow jacks are here set up as a double-stroke jack with a piston 39 which can constitute a part of the tractor load that is sufficiently great so that transverse shifting which can thus be effected will involve a modification of the position of the center of gravity of the tractor, to counterbalance the effect of forces applied thereto.

In addition, this principle of the shifting of a balancing overload by means of jacks can be applied to the shifting of an element of the tractor e.g. the driver's cab.

But is it possible also to obtain a remarkable balancing by application of these two jacks to the control of mechanism of wheel 8 described in French Pat. No. 1,319,231 of Apr. 6, 1962. Such mechanisms (FIG. 13) allow, in fact, equal and opposed displacements of wheels 8, to modify the transverse tilt of the tractor, and to direct the resultant of the forces acting upon it toward the narrow base of support.

These mechanisms present rods with cylinders 10 similar to rods 6 which were described above. These cylinders are hydraulically connected to two annular chambers 40d and 40g respectively, between two coaxial cylinders and pistons, and they here present identical sections to constitute with the rods two chamber systems with constant volume. It is understood that the two arms can replace piston 39, to be controlled by jacks 38, presenting in compact form sections suitable for the righting force to be developed by transfer of fluid, and contributing to the speed of the operation.

Finally (FIG. 14), the pistons of valves 20 can be combined with the slide of distributor 25 to ensure simultaneously, through the effect of differences of pressure of the rod cylinders, regulation of the pressure of supporting jack 16 and an operation of jack 38 which involves shifting of mass 39 and of fluid from cylinders 40 to their rods, the said shifts being appropriate to the angle of stability of the tractor.

In a modification of FIG. 13, and for moderate speed, for example, the constant volume systems associated with rods 6 ensure, by righting the tractor, a single position of equilibrium for the latter, which is held vertically. This consequently involves mutually equal pressures in these systems, namely in cylinders 10 and in jacks 17 and 18.

The slide of distributor 35 which is subject to antagonistic, mutually equal pressures, is thus held in its midposition, which ensures the unthrottled flow of the fluid driven by pump 19. The minimal pressure of the said pump is obviously controlled and selected to hold the tractor in this predetermined position of equilibrium.

When the loads on the rods tend to be different from each other (irregular or sloping terrain, turning at fairly high speed) constriction 37m is shifted by the difference of pressures developed in cylinders 10, to ensure a throttling of the fluid driven by pump 19, and because of the three-branch takeoff from the said pump, the slide allows distribution of the said fluid, e.g. by groove 37d, to jack 38 whereas groove 37g allows discharge toward the supply tank of jack 38g until by transfer of fluid the position (vertical in the figure) of equilibrium for which the pressures in cylinders 10 are equal and the slide is in its midposition is reestablished.

The above description allows comprehension, moreover, that a great number of modifications of device described above can be effected to stabilize vehicles of many kinds which present narrow support bases, since these devices comprise means for control of the pressure of a supporting jack associated with wheel stabilizers. Such a control is effected by variation of loads applied on the said wheels.

Such modifications can be adapted to the special features of vehicles presenting at least two wheels, disposed one behind the other in a longitudinal train or coaxially side by side, to form a narrow support base for the vehicle.

Figure 15:
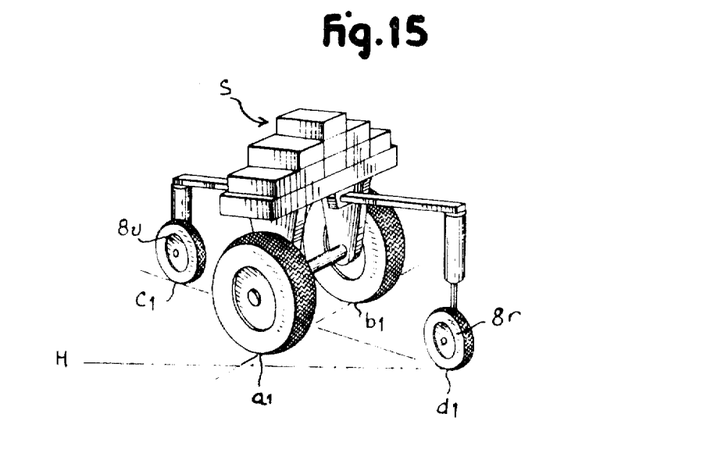
FIG. 15 shows schematically, in perspective, a vehicle with narrow transverse base equipped with a of the invention.

In this latter case (FIG. 15) wheels $8v$, $8r$ which constitute means for application to the ground are advantageously mounted on either side of the support base $a1$, $b1$ of the vehicle, on structures that are appropriate for the use of the vehicle. Thus, the stability of an apparatus of the steamroller type for compacting earth, e.g. excavated earth, can be ensured; the frame of such a roller is much overloaded for this purpose and must be correctly positioned toward front and back to apply load "S" on the transverse support base of its wheels as it moves along the line of maximum slope $c1$, $d1$, for example, of a heap of excavated earth.

With reference to modifications of this stabilizing device, it is possible to obtain righting effects for the vehicle analogous to those of the device of FIG. 13 by using a remarkably simple modification that avoids use of opposed jacks 38 and that allows transfer of fluid from the rod cylinders to jacks associated with said cylinders.

Figure 17:
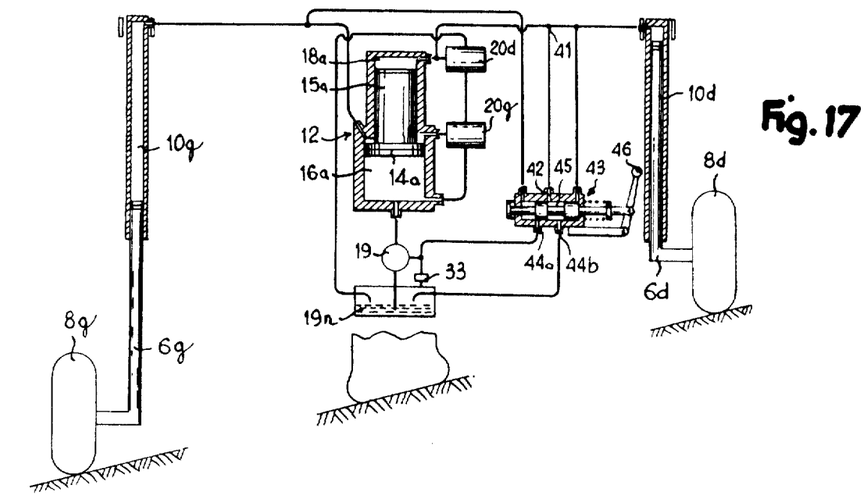
FIGS. 17 and 18 show two special positions of the device of FIG. 16 to clarify the results obtained by the device.
Figures 18, 19:
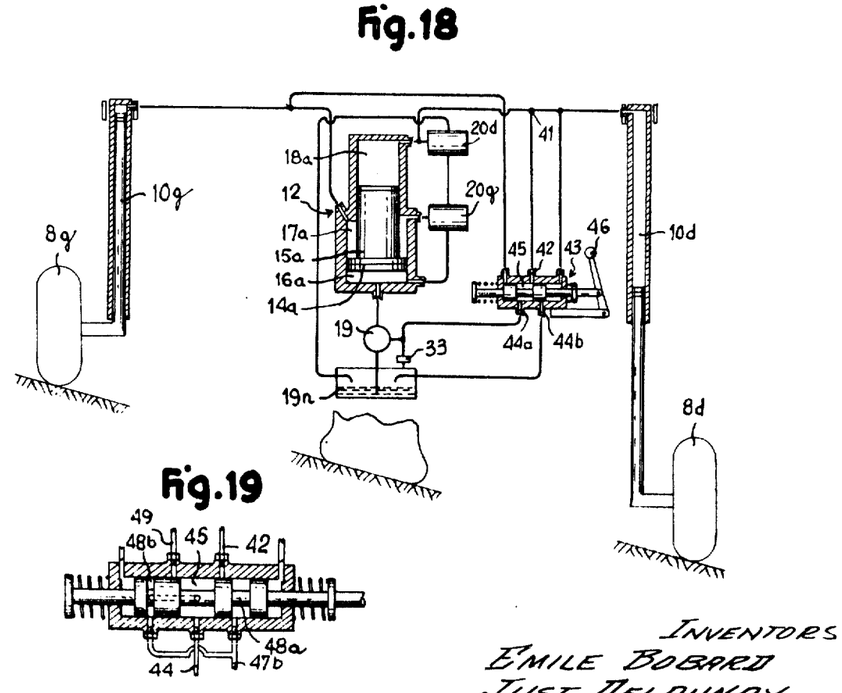
FIG. 19 shows, in longitudinal section, a modification of the valved distributor of the device of FIG. 16.

In such a modification (FIG. 16), the capacity of jacks $17a$ and $18a$ with valves 20 allows extensions and shortenings of corresponding rods 6 which are appropriate for the maximum angle of righting of the vehicle, taking into account the transverse angle that elastic tires can assume without skidding (FIGS. 17 and 18). Besides, the connecting conduit, e.g. for cylinder $10d$ and jack 18, presents a two-branch element 41 connected to middle port 42 of a distributor 43 which presents two other ports $44a$ and $44b$, respectively connected to a source of fluid under pressure and to a discharge circuit that is not pressurized, to which reference will be made later.

Distributor 43 presents a slide, with median groove 45 which can be manually controlled by a lever 46 or automatically controlled by the differences of pressure applied to the end faces of two pistons $47a$, $47b$ which are separated by the said groove 45 to ensure closing of ports $44a$, $44b$ (FIG. 16) and communication of port 42 and port $44a$ (FIG. 18) or port $44b$ (FIG. 17). In this way, the ends of distributor 43, being connected to cylinders 10, and the slide being subject to antagonistic urging of two recall springs, when there is a variation of ground slop (FIG. 17), wheel $8g$ tends to be overloaded as compared to wheel $8d$, and the distributor slide 43 ensures communication of conduit 41 and exhaust port $44b$, which allows the following sequence of operations at least partial emptying of cylinder $10d$, to shorten rod $6d$ which is at the upper level, closing valve $20d$ by a drop of pressure on said rod to supply jack $16a$ and consequently partly empty jack $18a$ via distributor 43 and discharge port $44b$ driving the fluid of jack $17a$ into cylinder $10g$ to elongate rod $6g$.

Obviously, the tractor is positioned substantially vertically without lifting its wheels 1, 2 because of shifts in opposite directions of wheels 8 with reference to the frame; these shifts are appropriate to the slope and contour of the terrain.

Besides, an identical result can be obtained by a slightly different process when wheel $8g$ is the lower one (FIG. 18). For this position, because of the reduction of the load on cylinder $10g$ and the increase of load on cylinder $10d$, the slide establishes communication between port $44a$ of the pressurized fluid circuit and branch 41 to supply cylinder $10d$ and jack $18a$, which has the effect of opening valve $20d$.

In any case, the supply must be sufficient to tend to lift the tractor in such a way that the pressure in cylinder $10g$, though it is less than that of cylinder $10d$, will ensure communication $44a$, 41 adequate for opening valve $20g$ and consequently effecting the transfer of fluid from cylinder $10g$ into jack $17a$, retracting pistons $14a$ and $15a$ and effecting a flow of fluid from pump 19 and jack $16a$ via the unpressurized circuit back to tank $19n$.

In such a modification, the two jacks $16a$ and $18a$ alternately play the role of supporting jack, and although valves 20 play a role identical with that described above, the asymmetry of operation of cylinders $10d$, $10g$ is due to the fact that one of them, namely ($10g$) is connected to one of the auxiliary jacks ($17a$) to constitute a closed constant volume system, whereas the other cylinder ($10d$) can be connected by the slide to the circuits of a system that allow either escape of the fluid, or supply of pressurized fluid.

Such a supply could be ensured by a pump like pump 19 of the embodiments of FIGS. 4, 12 and 13, for example, but to avoid utilization of a second pump, pump 19 is supplied with a known means that allows division of its flow as two streams, one of which, connected to jack $16a$, presents a constant output, the circuit of the other flow being connected to port $44a$ of distributor 43.

Finally, a modification of the slide of such a distributor comprises advantageously (FIG. 19) two supplementary constrictions $48a$, $48b$ which respectively allow escape of fluid from cylinder $10d$ via ports 42 and $44b$ and return of the fluid driven by the pump to the tank, via an axial conduit which establishes communication between grooves 45 and $48b$.

Besides, in the case of escape via circuit 42, $44b$, a port 49 allows a supplementary supply of jack $16a$ to avoid a delay in operation of the device.

Moreover, this principle of stabilization by righting can be applied to the stabilizing of a tractor with two aligned wheels on a preferential bearing provided on one of the sides; the support jack acts on a single mechanism by reduction of the load of the other mechanism which affords a lateral bearing for the vehicle.

Figure 20:
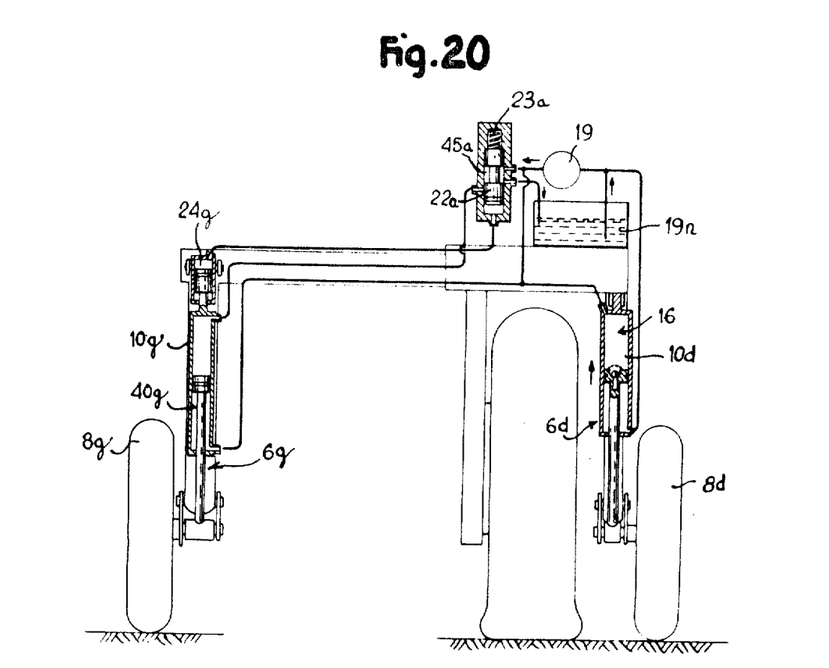
FIG. 20 shows, in transverse elevation and in partial section, a tractor with two aligned wheels equipped with a stabilizer of the invention.

In the modification of FIG. 20, the support jack 16 is incorporated in cylinder $10d$ of the rod of wheel $8d$, which here plays the role of a safety wheel. Rod $6g$ is equipped with a chamber $24g$ that detects a break in baring contact, to control a piston $22a$ of a slide with groove $45a$ upon encountering recall action of a spring $23a$, thus ensuring regulation of the pressure of jack 16.

Moreover, the piston cylinder of rod $6g$ is made as a two chamber cylinder $10g$, $40g$, allowing extensions and retractions of the rod that are appropriate to the orientation of the resultant of forces applied to the vehicle toward the support base.

These shortenings are ensured automatically by a direct supply of chamber $40g$ from the circuit of pump 19 when the pressure in jack 16 tends to increase because of reduction of load detected by chamber $24g$ and a discharge from chamber $10g$ into tank $19n$ via groove $45a$, with the slide acting as distributor.

The thrust of jack $40g$ connected to jack 16 must always be less than the force of reaction of the mechanism of wheel $8g$, to which cylinder $10g$ is associated.

This disposition avoids any lifting of wheel $8g$ and any directing of fluid into jack $40g$, to the detriment of support jack 16.

This result can be attained for example by arranging a narrow section for jack $40g$.

The elongations of rod $6g$ are ensured by transfer of fluid inversely to the transfers described above when the said rod is loaded; the supply of chamber $10g$ is effected by manual control of a cock, not illustrated, for the drive output of pump 19. Moreover, to avoid a lack of bearing of wheel $8d$ on irregular ground, cylinder $10d$ of jack 16 presents also a second chamber connected to an unpressurized circuit or to the suction circuit of the pump and, consequently in the latter case, exposed to a low vacuum. The piston of jack 16 also comprises a valve which allows direct transfer of fluid from the lower chamber of jack 16, to promote the contact of wheel $8d$ on the ground when there are surface irregularities that might break this contact.

Finally, it is possible to ensure the transverse stability of such a tractor by using only a mechanical stop for rod $6g$, simply furnished with a chamber $24g$ for regulation of the pressure of a supporting jack 16 constituting the opposite rod, said regulation being simply ensured by a valve identical with valves 20 described above and slaved to the said chamber.

Such results of support, with or without righting, can be ensured by combination of slide valve $22a$ with he rod of chamber $24g$ or rod $6g$ as described with reference to the modification of FIG. 7.

Of course, the present invention is not limited to the terms of the above specification, but on the contrary it embraces any variations that are within the reach of the individual skilled in the art.

What is claimed is:
1. A vehicle having
   a. a frame (3, 4, 5)
   b. wheels (1, 2) supporting the frame so that the vehicle is practically unstable in one direction (c, d) perpendicular to the general direction (a, b) of the points where said wheels (1, 2) touch the ground,
   c. a stabilizing device avoiding swinging of the frame in the direction of instability (c, d) and comprising:
      two elements for bearing on the ground (8d, 8g) placed on either side of the support surface (a, b) of the wheels (1, 2) and spaced from the latter.
      means (6d, 7d; 6g, 7g) for connection to the frame of said bearing elements, said connection means permitting displacements in height of said bearing elements with respect to said frame and including means (10d, 10g) of a hydraulic nature for the control of said displacements in height,
      an assembly of two chambers (17, 18) filled with fluid and connected respectively to the hydraulic means of the two bearing elements in order to form two closed systems and a jack (16) capable of ensuring a return of the fluid of said chambers to the hydraulic means of the bearing elements,
      a fluid circuit comprising a pipe on which are mounted, in series, a tank (19n), pump (19), a pipe for connection to the cylinder of the jack (16), two devices (20d, 20g) respectively connected to said closed systems and capable of regulating the pressure in the jack (16) under the effect of pressure variations of the fluids of the closed systems.

2. A vehicle according to claim 1, characterized in that each device for regulating the pressure of the jack (16) is constituted by a slide valve (20) having an exhaust groove (21) insensitive to the effects of the stream and a piston (22) subjected to the pressure of the fluid of a closed system against a thrust of a predetermined value (23) to control said slide valve.

3. A vehicle according to claim 2, characterized in that the thrust means of the slide of the valve are equipped with means or regulating the value of said thrust.

4. A vehicle according to claim 3, characterized in that each means of a hydraulic nature includes a hydraulic cylinder (10d, 10g) with a piston, constituting a prop of adjustable length (6d, 6g).

5. A vehicle according to claim 2, characterized in that each chamber (17 or 18) of a closed system is constituted by a jack connected to a hydraulic means (10d, 10g) and attached to the jack (16), at least in the direction of expansion of the latter.

6. A vehicle according to claim 5, characterized in that the cylinder of the jack (16) is rigidly united to the two jack cylinders of the closed systems.

7. For use with a vehicle having
   a frame (3, 4, 5),
   main wheels (1, 2) supporting the frame so as to determine on the ground an extended support surface (a, b), said frame being unstable in a direction (c, d) perpendicular to the general direction (a, b) of said support surface, a stabilizing device for voiding swinging of the frame in the direction of instability (c, d) and comprising
   a. two elements for bearing on the ground (8d, 8g) placed on either side of the support surface (a, b) and spaced from the latter,
   b. means (6d, 6g) for connecting said bearing elements to the frame, permitting displacements in height of the bearing elements in relation to the frame,
   c. two closed hydraulic systems (10d, 17; 10g, 18) capable of ensuring said displacements in height of the bearing elements,
   d. a jack (16) capable of actuating said hydraulic systems, and
   e. a fluid circuit comprising a pipe on which are mounted, in series, a tank (19n), a pump (19), a pipe for connection to the jack (16), an assembly of devices (20d, 20g) subjected to the closed hydraulic systems and able to regulate the the pressure in the jack (16), as a function of the variations of pressure created in said closed hydraulic systems under the effect of the unequal displacements in height of each of the bearing elements.

8. A vehicle according to claim 7, characterized in that a device ensuring restraint to an exhaust (25, 25a) is mounted in series in the pipe of the fluid circuit, upstream of the pipe for connection to the jack (16) and the assembly of devices (20d, 20g), with a view to ensuring a minimum pressure of the predetermined value in the upstream portion of the circuit, notably in the jack (16).

9. A vehicle according to claim 8, characterized in that the device ensuring pressure to the jack (16) is equipped with manual means (26, 26a) for adjusting the value of said pressure.

10. For use with a vehicle having
    a frame (3, 4, 5),
    main wheels (1, 2) supporting the frame so as to determine on the ground an extended support surface (a, b), said frame being unstable in a direction (c, d) perpendicular to the general direction (a, b) of said support surface,
    a stabilizing device for avoiding swinging of the frame in the direction of instability (c, d) and comprising
    a. two elements for bearing on the ground (8d, 8g) placed on either side of the support surface (a, b) and spaced from the latter,
    b. means (6d, 6g) for connecting said bearing elements to the frame, permitting displacements in height of the bearing elements in relation to the frame,
    c. two closed hydraulic systems capable of controlling said displacements in height of the bearing elements and connected to devices (20d, 20g) for regulating the pressure of the fluid circuit,
    d. a jack (16) capable of actuating the means for connecting the bearing elements to the frame, and
    e. a fluid circuit comprising a pipe on which are mounted, in series, a tank (19n), a pump (19), a pipe for connection to the jack (16), an assembly of devices (20d, 20g) subjected to the closed hydraulic systems and able to regulate the pressure in the jack (16), as a function of the variations of pressure created in said closed hydraulic systems under the effect of the unequal displacements in height of each of the bearing elements.